United States Patent Office
3,064,816
Patented Nov. 20, 1962

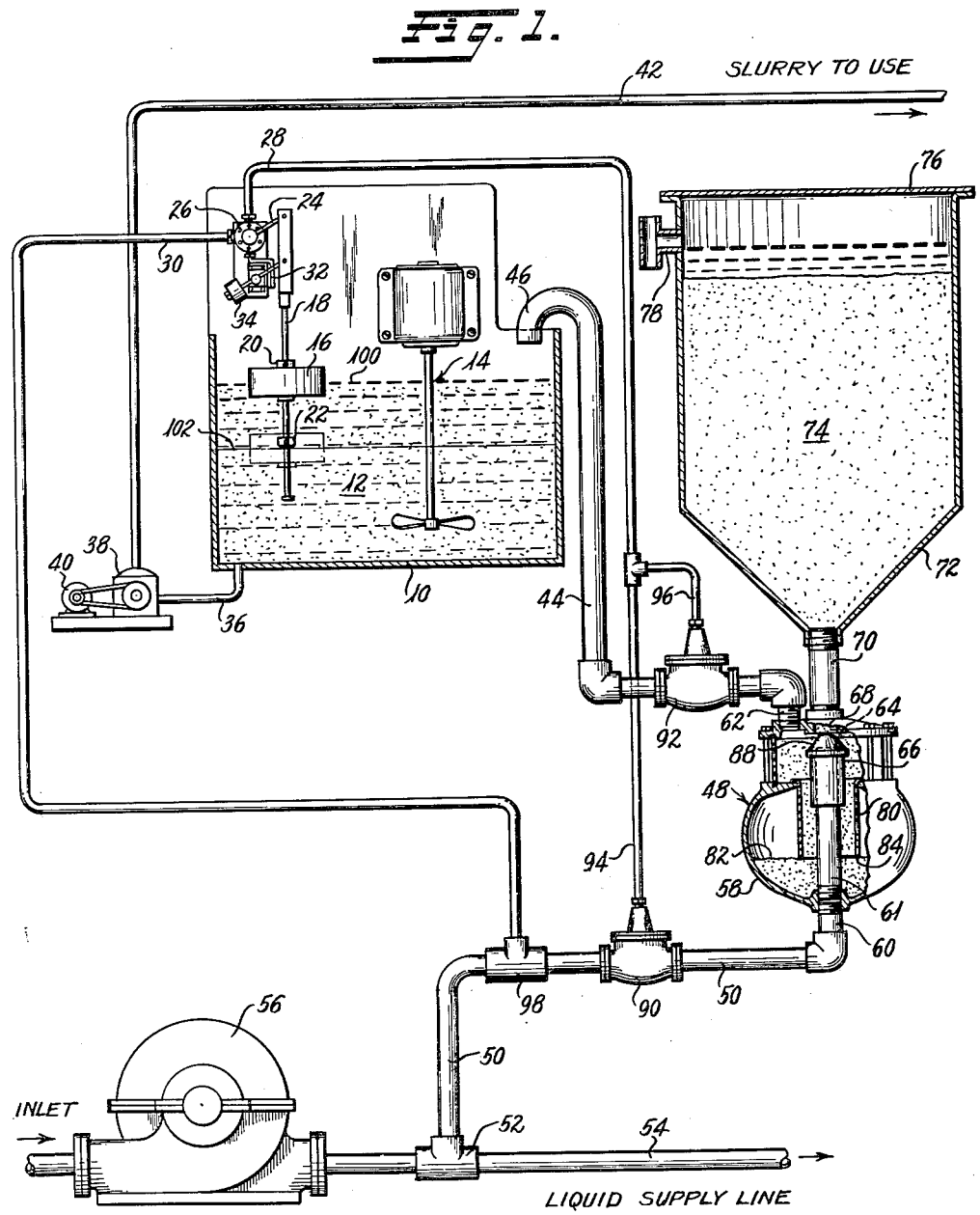

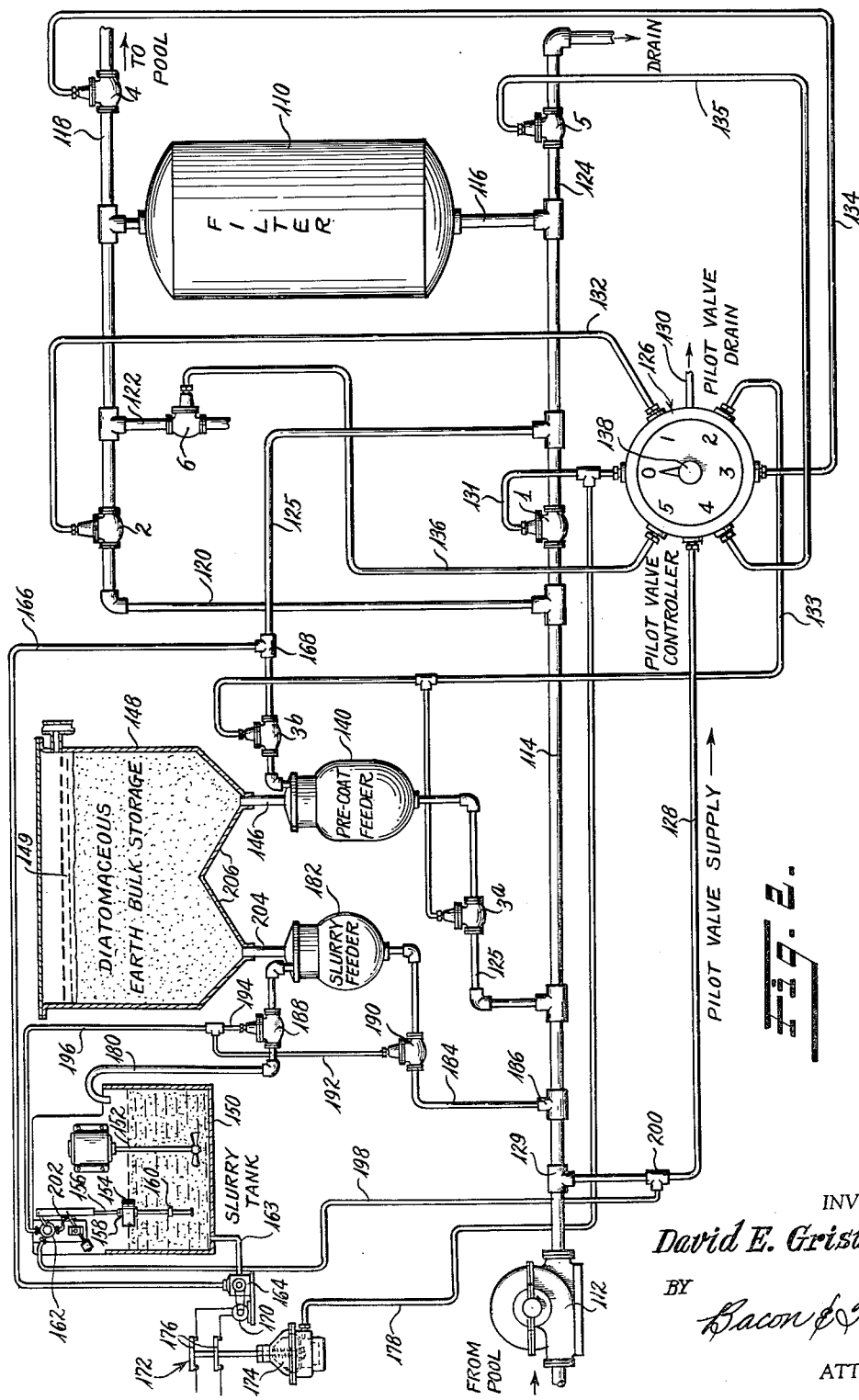

3,064,816
APPARATUS FOR THE PREPARATION, MAINTENANCE AND FEEDING OF SLURRIES
David E. Griswold, Newport Beach, Calif., assignor to Donald G. Griswold, Alhambra, Calif.
Filed Feb. 27, 1957, Ser. No. 642,869
13 Claims. (Cl. 210—104)

This invention relates to apparatus for the preparation, maintenance, and feeding of mixtures of liquids and particulate solids such as slurries, magmas, suspensions, and the like. In one aspect, the invention relates to apparatus for automatically combining a measured quantity of particulate solid material with a predetermined volume of liquid to provide a mixture or slurry having a predetermined concentration of solids in liquid, and for automatically maintaining a supply of such mixture as needed to meet the demands of a particular system served by the apparatus. The invention also relates to systems incorporating the automatic slurry maintenance apparatus and to combinations involving a plurality of slurry-feeding operations. One of the uses of the slurry-feeding apparatus is in the feeding of filter aid such as diatomaceous earth, to filter systems, and the apparatus will be described specifically in connection with such use. It will be understood, however, that the slurry preparation, maintenance, and feeding apparatus may be advantageously employed for any application wherein a slurry of constant predetermined concentration is required.

In filter systems it is often desirable to precoat the filter elements with filter aid and also to add filter aid during the filtering cycle to the unfiltered liquid before it enters the filter to maintain the porosity of the filter cake. During the precoating operation a relatively high rate of flow of filter aid is required. The addition of filter aid during the filtering cycle takes place at a much lower rate. The apparatus of the present invention automatically takes care of the filter aid feeding operations during both precoating and filtering phases. It performs all of the functions necessary to store and automatically deliver a precoat layer of diatomaceous earth and to automatically maintain a slurry mixture of diatomaceous earth and liquid for addition during the filtering cycle. All phases of bulk storage of diatomaceous earth, automatic measurement of required charges of diatomaceous earth for precoating, and automatic measuring of both diatomaceous earth and liquid to provide the slurry mixture are automatically handled. In the latter instance, the measured charge of earth is carried by an established volume of liquid into an agitated slurry mixture tank. The combination of the predetermined volume of diatomaceous earth and liquid provides a constant and accurately maintained slurry mixture of optimum concentration. Since the mixture is maintained automatically, it is practical to utilize a mixture of minimum concentration which can more easily be agitated, pumped, and conveyed with the least tendency to clog, pack, or corrode. The slurry mixture is pumped from this agitated tank to feed one or a battery of filter tanks. The total quantity of diatomaceous earth required for supplying the measured charges both for precoating and slurry maintenance is stored in one central bulk storage hopper making refilling convenient and infrequent. All of the diatomaceous earth stored in the hopper is kept under an automatically maintained liquid level thereby eliminating any objectionable dust in filling or during the operation of the apparatus.

Accordingly, it is an object of this invention to provide apparatus for automatically maintaining a supply of a liquid and particulate additive material of a substantially constant predetermined concentration.

Another object of the invention is to provide means for automatically replenishing a slurry-supply tank with a predetermined volume of liquid and a measured quantity of particulate additive material when the quantity of mixture in such tank has been partially depleted.

Another object of the invention is to automatically provide a substantially constant supply of slurry of uniform concentration.

A further object of the invention is to provide a filter aid-slurry maintenance apparatus for filter systems.

Another object of the invention is to provide means for supplying consistant and accurate charges of liquid and solids to a slurry mixing tank without the necessity of manual measurement.

Another object of the invention is to provide means for automatically providing a measured quantity of filter aid to a filter system during the precoating operation and for providing a slurry of optimum concentration during the filtering operation.

Another object of the invention is to provide a central means for bulk storage of particulate solids and for automatic withdrawal of measured charges for a plurality of operations.

Further objects and advantages of the invention will become apparent from the following description taken in conjunction with the accompanying drawings, in which:

FIG. 1 is an elevation, partially in section, showing the apparatus for maintaining a mixture or slurry of constant predetermined concentration; and FIG. 2 is an elevation, partially in section, showing a filter system utilizing the combined automatic precoating and slurry-maintaining apparatus of the invention.

Referring now to the drawings in detail, and particularly to FIG. 1 thereof, there is illustrated a holding tank 10 for a slurry mixture 12 which may be a mixture of any particulate solid material in a liquid medium. The tank 10 is provided with an agitator 14 for maintaining the particulate material of the slurry in a more or less homogeneously dispersed state within the liquid, i.e. to maintain a slurry of substantially uniform concentration and prevent the settling of solids. The tank 10 is further provided with a float 16 operable on a shaft 18 between adjustable stops 20 and 22. The shaft 18, in response to movement of the float 16 against the stops 20 or 22, as determined by the liquid level in the tank 10, operates an arm 24 of a pilot valve 26 which is adapted to selectively connect a valve-control pipe 28 to a pipe 30 connected to a source of fluid under pressure and to a drain 32 at atmospheric pressure. The float 16 in FIG. 1 is shown in full lines in its upper position against upper stop 20, in which position it has urged the shaft 18 and arm 24 upwardly to cause pilot valve 26 to connect pipe 28 to the fluid pressure pipe 30. At the lower position of the float 16, as shown in dashed lines, the float 16 acts by force of gravity upon stop 22 to urge the shaft 18 and arm 24 downwardly to cause pilot valve 26 to disconnect pipe 28 from fluid pressure pipe 30 and connect pipe 28 to the drain pipe 32. The float valve structure is provided with a counterbalance 34 to facilitate the operation thereof. The float-controlled pilot valve arrangement preferably is of the general type described in my copending application Ser. No. 547,800, filed November 18, 1955. However, it will be understood that for the purposes of the present invention any pilot valve structure may be used which can be provided with float-controlled means which in different positions will selectively connect a control port to pressure supply and drain ports.

Slurry may be withdrawn from the tank 10 as needed by means of an outlet line 36 connected to a pump 38 operated by a motor 40, the pump 38 thereby supplying a slurry through a line 42 to the point of use.

The tank 10 is automatically replenished with liquid and additive solid material through a conduit 44 having an outlet 46 at the top of the tank. The conduit 44 is connected through a hydraulically-operable bulk-solids feeder 48 to a conduit 50 which in turn is connected at T 52 to a source of liquid under pressure. This source may be a liquid supply pipe 54 connected to a pump 56. Tap water at city supply pressure may be used as a liquid supply source where an aqueous slurry is to be maintained. Conduits 44 and 50 may be regarded as a single liquid supply line for tank 10, such liquid supply line having a bulk-solids feeder 48 therein.

The bulk solids feeder 48 is of the type disclosed in my copending applications Ser. No. 435,250 and Ser. No. 553,821, now Patent No. 2,878,969, issued March 24, 1959, a calibrated device as disclosed in the latter application being specifically illustrated. Reference is made to the aforesaid application Ser. No. 553,821 for more detailed description of this unit. Briefly, feeder 48 comprises a container 58 having an inlet 60 for introduction of liquid from the source of liquid under pressure, and an outlet 62 for delivery of liquid and additive material from such container. The inlet 60 communicates with a standpipe 61 which extends upwardly within the container 58 and at its upper end 64 is provided with a plunger 66 which, by force of gravity, closes the standpipe end 64 when there is no flow of liquid upward through standpipe 61. The standpipe 61 is in alignment with an opening 68 in the top of the container 58, and opening 68 communicates by means of pipe 70 with the lower end of a bulk storage hopper 72 which contains particulate additive material 74, such as diatomaceous earth, or the like. The hopper 72 is provided with a removable cover 76 so that the material 74 can be replenished from time to time. The hopper 72 is also provided with an overflow 78 open to atmosphere, through which excess liquid in hopper 72 may drain. In the downward position of the plunger 66, when no liquid is flowing through the inlet 60, finely divided particulate material 74 from the hopper 72 settles downwardly into container 58.

In accordance with a feature disclosed in my copending application Ser. No. 553,821, container 58 is provided with a replaceable calibrated tube 80 which determines the volume of particulate material which will settle into the container 58. The upper level of particulate material in container 58, as shown at 82, is determined by the lower end 84 of the calibrated tube 80, thereby governing the total capacity of the feeder. A plurality of calibrated tubes of different lengths may be provided so that the volume of material can be selected in any desired manner within, of course, the limits of the container size.

When liquid is flowing through the inlet pipe 60, the plunger 66 is raised by hydraulic pressure to clear the end 64 of standpipe 61, and the conically shaped plunger top 88 seats within the opening 68, thereby closing the bulk storage hopper 72 from the container 58. The skirt portion of the plunger 66 deflects liquid downwardly into container 58, and the resulting turbulence thoroughly agitates the solids and provides a suspension. The measured charge of particulate material within the container 58 is thus incorporated into the liquid flowing through this container, and is carried outwardly through the outlet 62 and through conduit 44 into tank 10.

The flow of liquid through the feeder 48 and into the tank 10 is regulated by means of a pair of fluid-pressure-operable valves 90, 92. The structure of such valves is well known, and will not be described in detail herein. Suffice it to say that in the operation of the valves illustrated, application of fluid pressure through control pipes 94, 96 causes such valves to close, and the release of fluid pressure through these pipes 94, 96 causes these valves to open. The control pipes 94, 96 are connected to pipe 28 which, through the pilot valve 26, communicates either with the source of fluid under pressure through pipe 30 or with the drain to atmosphere through drain pipe 32. The valve-operating fluid in a typical embodiment is supplied at main line pressure from a T 98 connected in conduit 50 ahead of the supply to the valves 90, 92.

To initiate operation of the slurry-maintenance apparatus shown in FIG. 1, liquid is introduce into the hopper 72 and solids feeder 48 until the hopper 72 is filled to about 20% capacity. A supply of solid additive material is then dumped into the hopper 72 and a charge of this material settles down into the bulk solids feeder 48 displacing the liquid therein. Liquid is then introduced into the system from supply pipe 54 through conduit 50, bulk feeder 48, and conduit 44, the valves 90 and 92 being opened by the pilot valve control until the upper liquid limit is reached in the slurry-maintenance tank 10. In this initial operation, the slurry concentration in tank 10 may be adjusted by manual addition of solids to the tank in addition to that supplied from the conduit 44 with the liquid required for filling the tank. Once adjusted, automatic operation takes over and maintains a slurry of constant concentration as long as needed. After the initial filling of the hopper 72, each charge of solids required for filling the feeder 48 is automatically replaced with an equal volume of liquid. When the holding tank 10 has been filled, the agitator 14 is started to thoroughly mix the liquids and solids and the slurry 12 is then withdrawn through the line 36 by pump 38 and supplied through line 42 to use, according to demand. Upon depletion of the slurry 12 in the tank 10 below the lower float limit, the weight of the float 16 will cause the shaft 18 and arm 24 of pilot valve 26 to move downwardly to thereby connect valve-control pipe 28 to drain line 32, thereby releasing the fluid pressure holding the valves 90 and 92 in closed position. Valves 90 and 92 will then be opened by line pressure. Liquid from the liquid supply line 54 then passes through the line 50 and inlet 60 into the bulk-solids feeder 48 wherein it picks up a measured charge of particulate material 74 and carries it outwardly through outlet 62, valve 92, supply line 44, and into the holding tank 10. During this flow period, the plunger 66 of the feeder 48 will be closed, preventing further solid material from entering the container 58 from the bulk storage hopper 27.

When the tank 10 has been filled to the upper limit of the float 16, as determined by the liquid level 100 indicated on the drawing, the shaft 18 and arm 24 will be raised thereby causing pilot valve 26 to connect valve-control pipes 28, 94, 96 from the valves 90, 92 to the line 30 supplying fluid operating pressure to valves 90, 92. Valves 90, 92 thereby return to their closed position. The volume of liquid introduced during this period will thus automatically be determined by the upper and lower limits for the float operation, i.e. the volume of liquid will be that required to fill the tank 10 between the liquid levels 102 and 100 indicated on the drawing. This quantity of liquid will contain a precisely measured amount of solids as determined by the bulk feeder 48. The tank 10 will thus provide a continuous quantity of slurry, since when the tank 10 needs replenishing the float-controlled system will cause this replenishing operation to take place automatically without interruption of slurry withdrawal through line 36. During the period of no flow through the conduits 44 and 50—when valves 90, 92 are closed—the plunger 66 of feeder 48 will be in its downward position, permitting the container 58 to automatically refill with particulate material from the hopper 72. It will be understood that the volume of liquid introduced into tank 10 during the replenishing period can be varied by spacing the float stops 20 and 22 closer together for less liquid and farther apart for more liquid.

In accordance with the features more fully described in my aforementioned copending applications, all particulate material stored in the hopper 72 is kept under and automatically maintained liquid level, thereby eliminating any objectionable dust in filling or during the operation of the system. The charges required are automatically withdrawn from the bottom of the hopper 72 resulting in full movement of the particulate material and elimination of any dead pockets in the storage chamber. The particulate material 74 stored in bulk hopper 72 is maintained as a light, free-setting mass for two reasons: first, as a result of being under liquid, and, second, as each charge is withdrawn from the bottom of the hopper 72, it is displaced by an equal volume of liquid flowing upwardly through pipe 70. All of the particulate material entering the container 58 filters down from the storage hopper 72 through this displacing flow.

Referring now to FIG. 2, there is illustrated a filter system and automatic controls therefor of the type described in detail in my aforementioned copending application Ser. No. 435,250. This system may be advantageously utilized for swimming pool water filtration. A filter 110 of a type utilizing filter aid, such as diatomaceous earth, to coat the filter elements is diagramatically illustrated. A pump 112 withdraws water from the pool and pumps it through pipe 114 to the inlet 116 of the filter 110, and thence through return pipe 118 back to the pool. Branch pipes 120, 122 and 124, and by-pass line 125 are provided for use during filter backwashing and precoating operations. The operation of the system is controlled by means of fluid-pressure-actuated valves 1, 2, 3a, 3b, 4, 5, and 6. The operation of these valves is controlled in predetermined sequence by a pilot valve 126 provided with operating fluid by means of pipe 128 connected to the pipe 114 by T 129 at a point well upstream from the valve supply points. Pilot valves 126 is provided with a drain line 130 connected to atmospheric pressure or to pump suction, and with control lines 131, 132, 133, 134, 135, and 136 to the valves 1, 2, 3a, 3b, 4, 5, and 6. Operation of the pilot valve 126 may be accomplished by manually or automatically turning selector 138 to a position effecting the desired valve-controlling function. Since automatic valve-programming means are well known to the art, such means will not be described in detail herein.

In order to supply a charge of diatomaceous earth to the filter 110 for precoating the filter elements in preparation for a filtering cycle, a hydraulically-operated bulk-solids feeder 140 is provided in the by-pass line 125. The structure of the bulk-solids feeder 140 is similar to that previously described in connection with bulk-solids feeder 48 shown in FIG. 1, and further described in my copending application Ser. No. 553,821. Fluid-pressure-operable valves 3a and 3b are positioned in the by-pass pipe 125 on either side of the bulk-solids feeder 140, and control the injection of diatomaceous earth from the feeder 140 into the supply pipe 114 to the filter. The bulk-solids feeder 140 is connected through a conduit 146 to a bulk storage hopper 148 containing a relatively large supply of diatomaceous earth under an automatically maintained water level indicated at 149. As will be seen later, the bulk storage hopper 148 automatically provides diatomaceous earth for a plurality of bulk solid feeders.

The system of FIG. 2 includes a slurry-mixing tank 150 having an agitator 152 and a float 154 operating upon a shaft 156 between adjustable stops 158 and 160, whereby the operation of a pilot valve 162 is controlled. The slurry-mixing tank 150 provides a slurry of a constant optimum concentration to the filter system through pipe 163, pump 164, and pipe 166 connected in the by-pass line 125 by T 168 on the filter side of the precoat bulk-solids feeder 140. The pump 164 is driven by an electric motor 170 having a fluid-pressure-operated switch 172 in the electrical circuit thereto. The switch 172 is normally urged by means of spring 174 to a position closing the contacts 176. Fluid pressure for opening the switch contacts 176 against the force of spring 174 is supplied by pipe 178 which is connected to line 131 which supplies operating fluid to control valve 1 from the master pilot valve 126. In this manner, the switch contacts 176 are opened automatically to break the circuit to the electric motor 170 when operating pressure is supplied to line 131 to close valve 1 so that pump 164 supplies slurry from the tank 150 through pipe 166 and line 125 to the main pipe 114 only during the period in which valve 1 is open for the filtering cycle.

The slurry tank 150 is automatically replenished with a measured charge of liquid and additive solid material through conduit 180 which is connected through a second bulk-solids feeder 182 to the main pipe 114 through conduit 184 and T 186. Fluid-pressure-actuated valves 188 and 190 control the flow of replenishing fluid through conduits 184, bulk-solids feeder 182, and conduit 180 into the tank 150. These valves are supplied with operating fluid through pipes 192 and 194 connected to a common pipe 196 communicatng with float-controlled pilot valve 162. Operating pressure is supplied to pilot valve 162 through pipe 198 connected by T 200 into the main pilot valve supply pipe 128. Pilot valve 162 is also provided with a drain line 202 open to atmosphere. The operation of the pilot valve 162 is identical to that of pilot valve 26 previously described in connection with FIG. 1. The bulk-solids feeder 182 is of the same type as previously described in connection with bulk feeder 48 of FIG. 1, and may be identical to the bulk-solids feeder 140 used for injection of precoat material, except that it may be smaller in size, as shown. Diatomaceous earth to supply the feeder 182 is provided from the common storage hopper 148 through conduit 204. The bottom of the storage hopper 148 may be slanted as shown at 206 toward the conduits 146 and 204 supplying the feeders 140 and 182.

A typical program for the operation of the main valves 1, 2, 3a, 3b, 4, 5, and 6, of the system shown in FIG. 2, to accomplish filtering of swimming pool water through a diatomaceous earth filter is illustrated in the following table:

| Operation | Selector Position | Valves | | | | | |
|---|---|---|---|---|---|---|---|
| | | 1 | 2 | 3a, 3b | 4 | 5 | 6 |
| Service | 0 | Open | C | C | Open | C | C |
| Backwash Prep | 1 | C | Open | C | C | C | C |
| Backwash | 2 | C | Open | C | C | Open | C |
| Precoat Prep | 3 | C | C | C | C | C | C |
| Precoat | 4 | C | C | Open | C | C | Open |
| Service Prep | 5 | Open | C | Open | C | C | Open |

Open=drain; closed (C)=supply.

The valves 1, 2, 3a, 3b, 4, 5, and 6 open when connected by pilot valve 126 to the pilot valve drain 130 and close when they are connected by pilot valve 126 to line pressure through the pilot valve supply pipe 128. This type of valve operation is more fully described in my copending application Ser. No. 435,250 to which reference is made for a more detailed description. It will be seen that during the filtering cycle, water from the pool is supplied by pump 112 through the pipe 114 through filter inlet 116 to the filter 110, and is reintroduced into the pool through line 118, valves 1 and 4 being open during this operation and the other valves in the main system, namely 3a 3b, 2, 5, and 6 being closed. During this period, pipe 178 controlling the pressure-operable switch 172 will also be open to drain thereby causing the switch contacts 176 to close the circuit to the motor 170, whereby slurry from the slurry tank 150 is pumped into the liquid being filtered, so as to supply diatomaceous earth as required for building up a porous coat on the filter elements, and thereby prolong the filtering cycle. During the backwashing preparation, when valve 1 is closed, fluid-pressure-operated switch 172 will cause the contacts 176 to open so that no slurry is pumped from tank 150 into the system during this stage. During the backwash preparation, valve 2 is the only valve open, and there is no perceptible flow through the system. To effect the backwashing operation, valve 5 then opens permitting backwashing of the filter 110 through pipe 120 and valve 2, inlet 116, pipe 124, and valve 5 to drain. After the backwashing operation, all valves are closed in preparation for the precoating operation. After a stable condition has been obtained, valves 3a and 3b are automatically opened by actuation of the pilot valve 126 and valve 6 is also opened, thereby permitting flow of water through by-pass line 125 and precoat bulk-solids feeder 140 to filter 110, whereupon the measured charge of diatomaceous earth from the feeder 140 precoats the filter elements to the proper degree for starting another filtration cycle. After the precoating operation has been completed, another batch of diatomaceous earth from the bulk storage hopper 148 descends through the conduit 146 by gravity into the feeder 140 to thereby recharge it for the next precoating operation. Upon completion of the precoating operation, actuation of the pilot valve 126 again opens valves 1 and 4, closing the other main valves and again causing completion of the electrical circuit to the motor 170 of pump 164, so that slurry from the slurry tank 150 is again introduced during the service period. As the slurry in tank 150 is depleted to the lower position of the float 154 in holding tank 150 whereupon the bottom of the float engages the stop 160, pilot valve 162 actuates valves 188 and 190 to cause these valves to open, whereby liquid under line pressure passes through conduit 184 into slurry-solids feeder 182, picking up a measured charge of settled solids from such feeder and carrying it through conduit 180 into the slurry tank 150. Liquid continues to flow into the tank 150 through the conduits 184 and 180 until the upper float level is reached, whereupon the pilot valve 162 is actuated to close the valves 188 and 190. In this manner a slurry of predetermined concentration is constantly maintained in the tank 150. After completion of the slurry-tank-replenishing operation—when valves 188 and 190 are closed, another measured charge of diatomaceous earth will automatically be provided by the settling of diatomaceous earth from the bulk storage hopper 148 into the calibrated bulk-solids feeder 182. It will thus be seen that a fully automatic system has been provided for performing the dual operations of precoating and continuous addition of slurry of constant concentration during the filtering cycle.

While the system illustrated in FIG. 2 shows only one filter, it will be understood that a plurality of filters may be served by the diatomaceous earth-feeding apparatus. For each additional filter, it is merely necessary to provide an additional precoat feeder, the additional feeder being served by the same bulk storage hopper that feeds the single precoat feeder illustrated. The slurry-mixing and holding tank in this instance provides a central supply fed during the filter cycle of each filter.

It will be understood that the system illustrated may employ electrical or other automatic controls in lieu of the hydraulic controls shown. For example, the valves may be solenoid operated in response to electrical control means.

I claim:

1. Apparatus for maintaining a mixture of liquid and additive material of substantially constant predetermined concentration, comprising: a holding tank for said mixture, a service conduit connected with said tank through which said mixture is withdrawn as needed, a float-valve-controlled liquid supply line for intermittently replenishing said holding tank with a given volume of a mixture of liquid and addition material as determined by the position of the float at upper and lower mixture levels in said tank, and means in said supply line automatically introducing a measured batch of additive material into said supply line during a nonreplenishing period when the flow of liquid therein is interrupted, said additive material in said supply line being fed into the tank by liquid flowing through said supply line during the succeeding replenishing period, whereby said holding tank is intermittently replenished with a mixture of predetermined quantities of liquid and additive material upon depletion of the amount of mixture in said tank to said lower mixture level.

2. Apparatus for maintaining a mixture of liquid and additive material of substantially constant predetermined concentration, comprising: a holding tank for said mixture, a conduit connected to said tank supplying mixture into said holding tank, means in said conduit automatically introducing a measured batch of additive material into said conduit during intervals when there is no flow therein, a valve in said conduit, control means for opening and closing said valve to intermittently permit the flow of a liquid in said conduit which liquid mixes with the additive material and flows into the holding tank, and float means in said holding tank, responsive to the mixture level therein for actuating said control means to thereby open and close said valve at predetermined mixture levels in said tank so that a predetermined volume of mixture of liquid containing said measured batch of additive material is intermittently introduced into said holding tank.

3. The apparatus of claim 2 in which the float means in said holding tank include adjustable means for predetermining the mixture levels at which the float means actuate the valve control means whereby the volume of liquid introduced with each charge of additive material can be selectively varied.

4. Apparatus for maintaining a mixture of liquid and additive material of substantially constant predetermined concentration, comprising: a holding tank for said mixture, a mixture supply conduit connected to said holding tank, hydraulically-operable feeder means in said conduit automatically introducing a measured batch of additive mtaerial into said conduit during intervals when there is no flow therein, a fluid-pressure-operable valve in said conduit to intermittently permit the flow of a liquid in said conduit, which liquid mixes with the additive material and flows into the holding tank, and a float-controlled pilot valve connected to said fluid-pressure-operable valve to control the supply of operating fluid thereto, the float of said float-controlled pilot valve being responsive to the mixture level in said holding tank so that said pilot valve causes said fluid-pressure-operable valve to open at a predetermined lower mixture level in said tank and to close at a predetermined upper mixture level to thus permit fluid to flow through said conduit and carry said batch of additive material previously introduced in said conduit into said tank, whereby said tank is intermittently replenished from said supply conduit with a known volume of liquid carrying a measured quantity of additive material.

5. Apparatus for maintaining a slurry of substantially constant predetermined concentration, comprising: a slurry-holding tank, means for agitating the slurry in said tank, a conduit connecting said tank to a source of supply liquid under pressure, a hydraulically-operable batch feeder in said conduit in advance of said tank for intermittently introducing a measured batch of finely-divided solids into liquid flowing through said conduit to said tank, a bulk-storage container for a relatively large quantity of finely-divided solids, said bulk-storage container and batch feeder being arranged so that finely-divided solids from said container settle by gravity into said batch feeder during the period in which there is no flow of liquid through said conduit, a fluid-pressure-operable valve in said conduit on each side of said batch feeder, a pilot valve controlling the flow of operating fluid to said fluid-pressure-operable valves to govern the opening and closing thereof, and float means operable between predetermined upper and lower mixture levels in said slurry tank to actuate said pilot valve to effect the opening of said fluid-pressure-operable valves at said lower mixture level and close said fluid-pressure-operable valves at said upper mixture level, whereby the tank is automatically replenished with a predetermined volume of liquid carrying a measured charge of finely-divided solids.

6. The apparatus of claim 5 wherein said batch feeder is provided with means operable by flow of liquid through said conduit to close said feeder from said bulk storage container and during periods of no liquid flow operable by force of gravity to establish open communication between said container and feeder whereby said feeder is automatically recharged with settled solids.

7. Apparatus for supplying filter aid to the filter of a filter system during precoating and filtering cycles, comprising: a bulk-storage container for a relatively large supply of filter aid, a first filter-aid feeder arranged to receive a measured batch of filter aid from said container by gravity settling, valved conduit means connected to said feeder for transferring a flow of liquid from a filter supply line through said feeder and into said filter during the precoating cycle, a slurry-holding tank, a float-controlled slurry supply line for replenishing said holding tank intermittently with a given volume of slurry as determined by the position of the float at upper and lower slurry levels in said tank, a second filter-aid feeder arranged to receive a measured batch of filter aid from said bulk-storage container by gravity settling, said second filter-aid feeder being connected in said float-controlled slurry supply line in advance of said tank so that liquid flowing therethrough transfers the measured batch of filter aid to the slurry-holding tank whereby this tank is automatically and intermittently replenished with predetermined quantities of liquid and filter aid and a filter-aid slurry of substantially constant concentration is maintained, and means for feeding said filter-aid slurry from said tank to the filter during the filtering cycle.

8. The apparatus of claim 7 wherein the valved conduit means connected to said first filter-aid feeder comprise a by-pass line around a fluid-pressure-operable valve in said filter supply line, said by-pass line having a fluid-pressure-operable valve on each side of said filter-aid feeder, and wherein unitary pilot valve control means are provided for selectively controlling the supply of operating fluid to said valve in the filter supply line and to the valves in the by-pass line to thereby control precoating and filtering operations.

9. The apparatus of claim 8 wherein the means for supplying filter-aid slurry during the filter cycle include fluid pressure-operable means controlled by said unitary pilot valve control means.

10. In a filter system utilizing filter aid during precoating and filtering cycles, the combination comprising: a bulk-storage container for a relatively large supply of filter aid from said bulk-storage container directly, means for feeding a measured batch of filter aid into said filter system only during said precoating cycle, a filter-aid slurry holding tank, means for delivering a predetermined quantity of filter-aid slurry from said slurry tank into said filter system only during the filter cycle, and means for automatically replenishing said filter-aid slurry tank with a mixture of a predetermined quantity of liquid and a measured charge of filter aid from said bulk-storage container, the volume of said mixture being equal to said predetermined quantity of filter-aid slurry delivered into said filter system from said slurry tank during the filter cycle whereby a supply of slurry of substantially constant concentration is maintained in said slurry holding tank.

11. Apparatus for maintaining a mixture of liquid and additive material of substantially constant predetermined concentration, comprising: a holding tank for said mixture; a conduit connected to said tank through which said mixture can be withdrawn at any time as needed; a float-valve-controlled supplied line for intermittently replenishing said holding tank with a given volume of mixture as determined by the position of the float at upper and lower mixture levels in said tank to intermittently feed a definite quantity of mixture; and means connected with said supply line for automatically introducing a measured batch of additive material into said supply line during a nonreplenishing period when the flow of liquid therein is interrupted, said additive material in said supply line being fed into the tank by liquid flowing through said supply line during the succeeding replenishing period, whereby said holding tank is intermittently replenished with predetermined quantities of liquid and additive material upon depletion of the mixture in said tank to said lower mixture level, irrespective of whether said mixture is being concurrently withdrawn from said holding tank.

12. Apparatus for maintaining a mixture of liquid and additive material, as defined in claim 11, in which the float-valve-controlled supply line is open only during the intermittent replenishing periods.

13. Apparatus for maintaining a mixture of liquid and additive material, as defined in claim 11, in which the float-valve-controlled supply line includes a float-controlled valve upstream and a float-controlled valve downstream of said batch introducing means, said valves being open only during the intermittent replenishing periods.

References Cited in the file of this patent

UNITED STATES PATENTS

| | | |
|---|---|---|
| 2,025,570 | Clark | Dec. 24, 1935 |
| 2,455,130 | Lomax | Nov. 30, 1948 |
| 2,631,969 | Klueger | Mar. 17, 1953 |
| 2,649,771 | Parks | Aug. 25, 1953 |
| 2,653,623 | Hippen et al. | Sept. 29, 1953 |
| 2,710,016 | Gallmeyer | June 7, 1955 |

UNITED STATES PATENT OFFICE
CERTIFICATE OF CORRECTION

Patent No. 3,064,816

November 20, 1962

David E. Griswold

It is hereby certified that error appears in the above numbered patent requiring correction and that the said Letters Patent should read as corrected below.

Column 4, line 5, for "introduce" read -- introduced --; line 42, for "27" read -- 72 --; column 7, line 51, after "supply" insert -- for slurry --; line 66, for "addition" read -- additive --.

Signed and sealed this 17th day of December 1963.

(SEAL)
Attest:
ERNEST W. SWIDER
Attesting Officer

EDWIN L. REYNOLDS
Acting Commissioner of Patents